(12) United States Patent
Okazaki et al.

(10) Patent No.: US 6,626,495 B2
(45) Date of Patent: Sep. 30, 2003

(54) SEAT RECLINING DEVICE (75) Inventors: Hiroyuki Okazaki, Chiryu (JP); Yukifumi Yamada, Toyota (JP); Naoaki Hoshihara, Obu (JP); Sadao Ito, Anjo (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/127,405

(22) Filed: Apr. 23, 2002

(65) Prior Publication Data

US 2002/0171280 A1 Nov. 21, 2002

(30) Foreign Application Priority Data

| Apr. 23, 2001 | (JP) | ................................. 2001-124927 |
| Jun. 26, 2001 | (JP) | ................................. 2001-193673 |
| Jul. 17, 2001 | (JP) | ................................. 2001-216587 |

(51) Int. Cl.$^7$ ................................................ B60N 2/02
(52) U.S. Cl. .................................. 297/367; 297/378.12
(58) Field of Search ............................ 297/367, 378.12

(56) References Cited

U.S. PATENT DOCUMENTS

| 5,161,856 | A | * | 11/1992 | Nishino | ...................... 297/367 |
| 5,762,400 | A | * | 6/1998 | Okazaki et al. | ............. 297/367 |
| 5,779,313 | A | | 7/1998 | Rohee | |
| 5,816,656 | A | | 10/1998 | Hoshihara et al. | |
| 5,984,413 | A | * | 11/1999 | Baloche et al. | ............. 297/367 |
| 6,082,821 | A | * | 7/2000 | Baloche et al. | ........ 297/354.12 |
| 6,095,608 | A | * | 8/2000 | Ganot et al. | ................ 297/367 |
| 6,474,740 | B1 | * | 11/2002 | Kondo et al. | ............... 297/367 |
| 2002/0033627 | A1 | * | 3/2002 | Hoshihara et al. | ......... 297/367 |
| 2002/0043852 | A1 | * | 4/2002 | Uramichi | .................... 297/366 |
| 2002/0096925 | A1 | * | 7/2002 | Uramichi | .................... 297/367 |

* cited by examiner

*Primary Examiner*—Peter M. Cuomo
*Assistant Examiner*—Sarah C. Burnham
(74) *Attorney, Agent, or Firm*—Burns, Doane, Swecker & Mathis, LLP (57) ABSTRACT

A seat reclining device has a first arm member adapted to be secured to the seat cushion frame or the seat back frame, a second arm member rotatably supported by the first arm member and adapted to be secured to the other of the seat cushion frame and the seat back frame, and a plurality of pawls for locking an adjusted angle of the seat back. The pawls are disposed on the first arm member and include at least a first pawl and a second pawl. Only one of the first and second pawls is provided with an engaging portion. The second arm member is provided with a receiving portion for preventing the engagement of the outer gear with the inner gear when the engaging portion contacts the receiving portion during relative rotational movement of the first and second arm members.

20 Claims, 5 Drawing Sheets

SEAT RECLINING DEVICE

This application is based on and claims priority under 35 U.S.C. §119 with respect to Japanese Application No. 2001-193673 filed on Jun. 26, 2001, Japanese Application No. 2001-124927 filed on Apr. 23, 2001, and Japanese Application No. 2001-216587 filed on Jul. 17, 2001, the entire content of each of which is incorporated herein by reference.

FIELD OF THE INVENTION

This invention generally relates to a vehicle seat. More particularly, the present invention pertains to a vehicle seat reclining device having a plurality of pawls serving as a locking mechanism.

BACKGROUND OF THE INVENTION

A known seat reclining device for a vehicle seat is disclosed in U.S. Pat. No. 5,779,313 issued on Jul. 14, 1998. The seat reclining device described in this patent has a lower arm fixed to a seat cushion and an upper arm fixed to a seat back for adjusting and locking the reclining angle of the seat back relative to the seat cushion in an adjustable angle region. The upper arm is rotatably supported by the lower arm, and a plurality of pawls having a gear portion on the top edge are able to slide in the lower arm. A circular inner gear portion is formed on the upper arm and is capable of engaging with the gear portion on each of the pawls. To control the engagement of the inner and outer gear portions, a locking mechanism is provided. The locking mechanism includes a cam member arranged to rotate on the lower arm for moving the plural pawls simultaneously in the radial direction toward the inner gear portion. The seat reclining device is also provided with a lock canceling angle region where the engagement of the inner and outer gear portions is prevented when the seat back is reclined in the forward direction more than a predetermined angle. Thus a front seat outfitted with the seat reclining device can provide relatively easy access for an individual to the rear seat. Each of the pawls has a projection, and the upper arm is provided with a plurality of receiving portions each opposed to the projection on one of the pawls for preventing the engagement of the gear portions in the lock canceling angle region.

Another seat reclining device is disclosed in U.S. Pat. No. 5,816,656 issued on Oct. 6, 1998. This reclining device is provided with two stopper projections formed to define reclining angle regions.

In the aforementioned seat reclining devices, the circular inner gear portion is divided into plural angle regions by the plural stoppers, with the number of angle regions corresponding to the number of pawls. Each pawl engages with the inner gear portion only within each allocated angle region. Therefore, the reclining angle which is a total of the lock canceling angle region and the adjustable angle region is determined by the number of pawls. As an example, in the case of the reclining device disclosed in U.S. Pat. No. 5,779,313 which has three pawls, the maximum reclining angle region can be set to more than 100 degrees. However, if a greater number of pawls is needed to increase the strength, such as four or five pawls, it is not possible to achieve a sufficiently large reclining angle region such as more than 100 degrees.

Accordingly, a need exists for a vehicle seat reclining device which permits a desired reclining angle region without limitations imposed by the number of pawls. That is, it would be desirable to provide a vehicle seat reclining device in which the number of pawls can be increased without limiting the reclining angle region in the same manner as known vehicle seat reclining devices.

SUMMARY OF INVENTION

In accordance with one aspect, a seat reclining device includes a first arm member adapted to be secured to one of a seat cushion frame and a seat back frame, a second arm member rotatably supported by the first arm member and adapted to be secured to the other of the seat cushion frame and the seat back frame, and at least a first pawl and a second pawl movably disposed on the first arm member, with each of the first and second pawls being provided with an outer gear portion. An inner gear portion is formed on the second arm member for being engaged by the outer gear portion of the first and second pawls to fix a relative rotational position of the first and second arm members. A receiving portion is provided on the second arm member, and at least one stopper is provided on the second arm member. A projection is provided on only one of the first and second pawls to engage the receiving portion during relative rotational movement of the first and second arm members to prevent the outer gear portions from engaging the inner gear portion, and to engage the stopper during relative rotational movement of the first and second arm member to define a forwardmost or rearwardmost reclining angle of the first and second arm members.

By the above described configuration, the number of pawls can be increased without being limited by the reclining angle region. This can provide a compact and high strength reclining device.

According to another aspect, a seat reclining device includes a first arm member adapted to be secured to one of a seat cushion frame and a seat back frame, a second arm member rotatably supported by the first arm member and adapted to be secured to the other of the seat cushion frame and the seat back frame, and at least a first pawl and a second pawl disposed on the first arm member, with each of the first and second pawls having an outer gear portion. An inner gear portion is formed on the second arm member and is engageable with the outer gear portion of the first and second pawls. The second arm member is also provided with a receiving portion. Only one of the first and second pawls is provided with an engaging portion that engages the receiving portion during relative rotational movement between the first and second arm members to prevent engagement of the outer gear portion of the first and second pawls with the inner gear portion.

In accordance with a further aspect, a seat reclining device includes a first arm member adapted to be secured to one of a seat cushion frame and a seat back frame, a second arm member rotatably supported by the first arm member and adapted to be secured to the other of the seat cushion frame and the seat back frame, and a plurality of pawls disposed on the first arm member and each provided with an outer gear portion, with the plurality of pawls including a first pawl and a second pawl. An inner gear portion formed on the second arm member is engageable with the outer gear portion on each of the first and second pawls. The second arm member is also provided with at least one stopper. Only one of the first and second pawls is provided with an engaging portion that engages the stopper during relative rotational movement of the first and second arm member to define a forwardmost or rearwardmost reclining angle of the first and second arm members.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
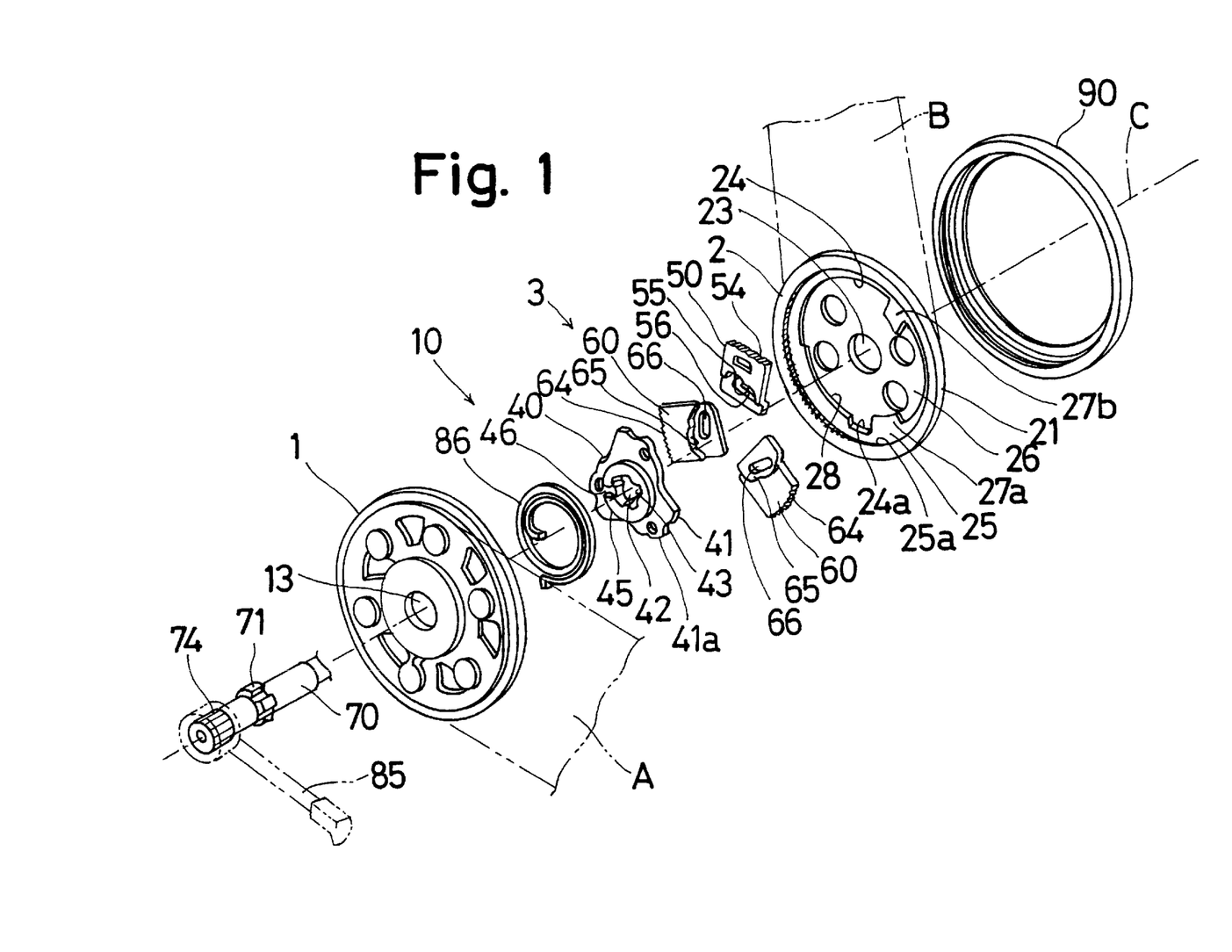
FIG. 1 is an exploded perspective view of the seat reclining device according to a first embodiment of the present invention.

Referring initially to FIG. 1, a seat reclining device 10 according to one embodiment includes a lower arm 1 and an upper arm 2. In the illustrated embodiment, the lower and upper arms 1, 2 are circular plate shaped members. The lower arm 1 is secured on the seat cushion frame A and the upper arm 2 is secured on the seat back frame B. The securement of the lower arm 1 to the seat cushion frame A and the securement of the upper arm 2 to the seat back frame B can be accomplished by a welding process. The lower arm 1 and the upper arm 2 are assembled to one another in an overlapping manner.

Figure 2:
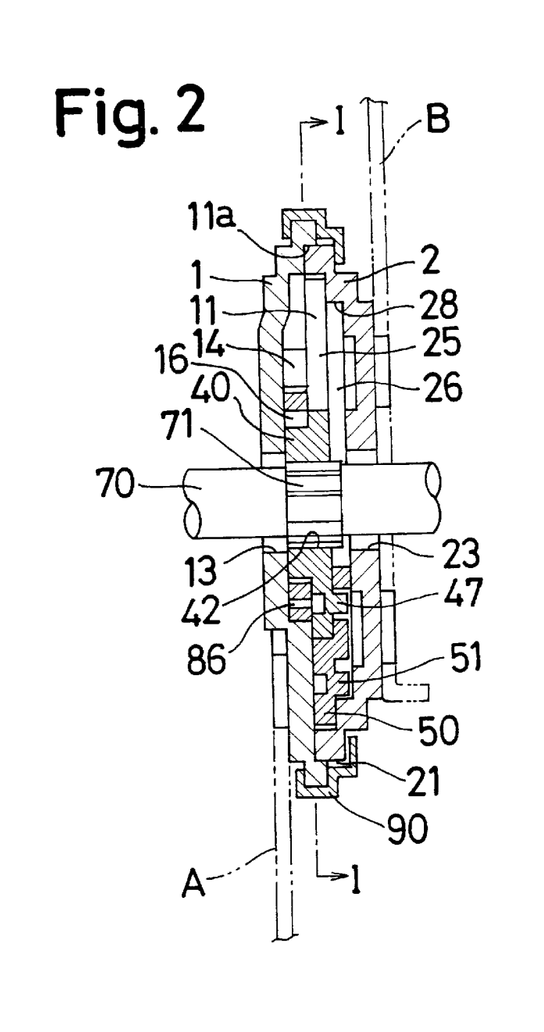
FIG. 2 is a cross-sectional view of the seat reclining device shown in FIG. 1 in an assembled state taken along the section line II—II of FIG. 3.

As shown in FIG. 2, a concave or recessed portion 11 is formed centrally on the lower arm 1 by stamping in the thickness direction, for example by a half blanking process. The recessed portion 11 opens in a direction towards the upper arm 2 and has an inner surface for supporting the upper arm 2. The upper arm 2 and the lower arm 1 are able to rotate relative to each other about an axis C shown in FIG. 1.

As depicted in FIGS. 1 and 2, a rounded or annular outer surface 21 of the upper arm 2 slides along the inner surface 11a of the lower arm 1. The outer and inner surfaces 21, 11a work like an axle and a bearing for effecting rotation of the seat reclining device 10.

The outer circumferential surface of the lower arm 1 is covered by a holder 90 which also contacts a side surface of the upper arm 2. The holder 90 rotatably holds the upper arm 2 relative to the lower arm 1.

As illustrated in FIGS. 1 and 2, a concave or recessed portion 25 is also formed on the upper arm 2 by, for example, a half blanking process. The recessed portion 25 opens in a direction towards the lower arm 1. An annular or circular inner gear 25a is centrally provided on the inner circumferential surface of the upper arm 2 and is formed so as to have its center located on the rotational axis C. Positioned radially inwardly of the recessed portion 25 is another concave or recessed portion 26 formed by, for example, a half blanking process. This second recessed portion 26 is also centrally located and is formed so as to have its center located on the rotational axis C. The second recessed portion 26 has an inner circumferential surface 24. A first stopper portion 27a and a second stopper portion 27b are formed on the inner circumferential surface 24. Both stopper portions 27a, 27b project toward the axis C and are located in an angularly spaced apart relation to one another.

An indented portion 24a is formed adjacent to the first stopper 27a. The indented portion 24a is formed at the same distance from the rotational axis C as the inner circumferential surface 24. Also an engagement surface 28 is formed between the indented portion 24a and the inner circumferential surface 24. The engagement surface 28 is positioned at a smaller distance from the rotational axis C than the inner circumferential surface 24 and occupies or extends over a certain angle region or rotational angle. The distances of the above described surfaces from the rotational axis C become smaller in the following order: the inner circumferential surface 24, the engagement surface 28, and the edge surfaces of the first and second stopper portion 27a, 27b.

A lock mechanism 3 is disposed between the lower arm 1 and the upper arm 2. The lock mechanism includes a cam 40 and a plurality of pawls. In this embodiment, the lock mechanism 3 is comprised of three pawls, including two different pawls 50, 60. The three pawls 50, 60, 60 are located or positioned in a plane perpendicular to the rotational axis C and are spaced apart from one another at equal angular intervals. The three pawls include one first pawl 50 and two second pawls 60. The two different pawls differ from one another in that the first pawl 50 has a projection 51 on its side surface forming an engaging portion of the first pawl, while the second pawls 60 do not have such a projection. In all other respects, the first and second pawls 50, 60 are the same.

Figure 5:
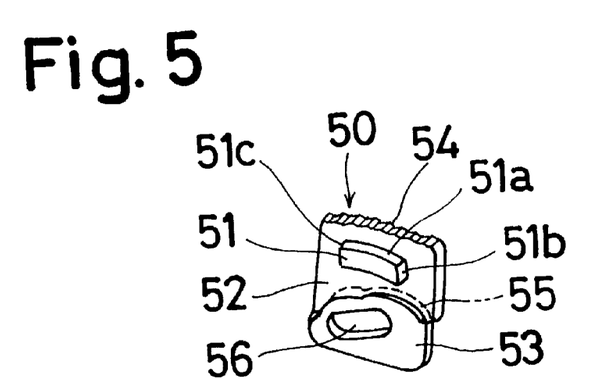
FIG. 5 is a perspective view of the first pawl used in the seat reclining device shown in FIG. 1.
Figure 6:
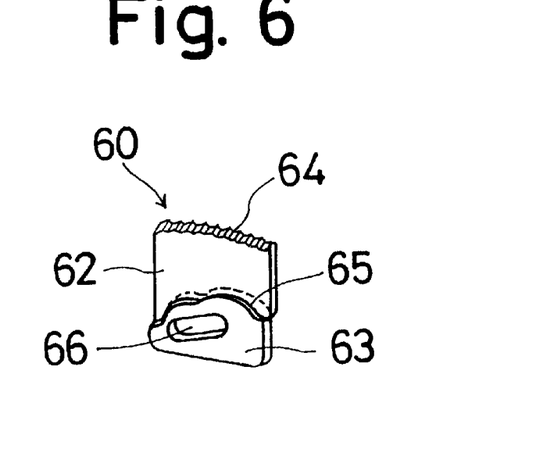
FIG. 6 is a perspective view of the second pawl used in the seat reclining device shown in FIG. 1.

As shown FIGS. 5 and 6, each of the pawls 50, 60, which can be made as a steel plate, possesses a generally rectangular outline and is comprised of a first plate portion 52, 62 and a second plate portion 53, 66, with a stepped region between the first and second plate portions. An outer gear portion is provided on the top edge of the first plate portions 52, 62 of each pawl 50, 60. The outer gear portions 54, 64 are adapted to engage the inner gear portion 25a of the upper arm 2. In addition, as shown in FIGS. 5 and 6, a cam surface 55, 65 is formed on each of the pawls 50, 60 at surfaces of the first plate portions 52, 62 located opposite the outer gear portions 54, 64 on the stepped portion between the first plate portion 52, 62 and the second plate portion 63, 66. A cam hole 56, 66 is also formed in each of the pawls 50, 60 and penetrates or passes through the second plate portion 53, 63 with respect to the thickness direction of the second plate portion. As shown in FIGS. 5 and 6, the right and left side edges of each pawl 50, 60 are straight and parallel with each other and define a width of the pawls 50, 60.

Figure 3:
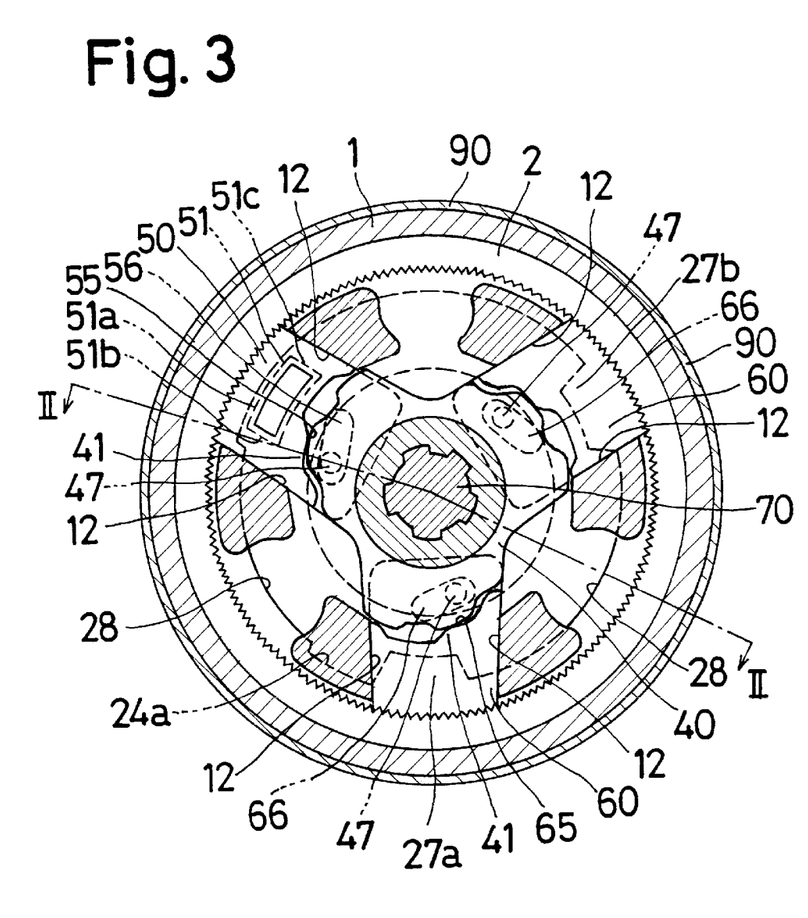
FIG. 3 is a front view of the seat reclining device shown in FIG. 1 in an assembled state illustrating the locked condition.

As best illustrated in FIG. 3, three pairs of guide walls 12 are positioned in and project from the recessed portion 11 of the lower arm 1. The guide walls 12 forming each pair are arranged parallel to one another and are spaced apart by a distance that is equal to the width of the pawls 50, 60. The pawls 50, 60 are positioned between respective pairs of guide walls 12 and are adapted to move toward and away from the axis C while being guided by the guide walls 12.

The cam 40 rotates about the rotational axis C and has three cam surfaces 41 located in the recessed portion 26 of the upper arm 2. The three cam surfaces 41 are spaced apart at equal angular intervals with each other, and are adapted to contact the cam surfaces 55, 65 of each of the pawls 50, 60. When the cam 40 rotates in the counter clockwise direction in FIG. 3, the pawls 50, 60 are pushed toward the inner gear portion 25a for effecting meshing engagement of the outer gear portions 54, 64 on the pawls 50, 60 with the inner gear portion 25a on the upper arm 2. A plurality of pins 47 project from the side surface of the cam 40 at a position nearer to the rotational axis C than the cam surfaces 41. Each of the pins 47 is positioned in the cam hole 56, 66 of a respective pawl 50, 60.

As shown in FIG. 1, a hinge shaft 70 is disposed on the rotational axis C, and passes through a hole 13 in the lower arm 1, a hole 42 in the cam 40 and a hole 23 in the upper arm 2. A spline 71 is formed at an intermediate portion of the hinge shaft 70 considered with respect to its lengthwise direction. The spline 71 defines a plurality of grooves extending in the lengthwise direction. A female spline 43 is also provided on the inner periphery of the center hole 42 of the cam 40. The female spline 48 engages the spline 71 on the hinge shaft 70 so that the hinge shaft 70 and the cam 40 are fixed and moved together.

Further, one end portion of the hinge shaft 70 is provided with a serration 74 having plural grooves. An operation handle 85 is installed on the end portion of the hinge shaft 70 and is fixed to the hinge shaft 70 by engagement of a female serration on the operation handle 85 with the serration 74. Thus, through operation of the operation handle 85, the cam 40 rotates.

As shown in FIG. 2, the lower arm 1 has further a concave or recessed portion 16 formed radially inside the recessed portion 11, with the two recessed portions having the same center. The recessed portion 16 has a groove 14 formed on its inner periphery and extending in the radial direction. Also another groove 46 is formed on a boss portion 45 of the cam 40. A spiral spring 86 is installed around the axis C and has one end engaging the groove 14 and the other end engaging the groove 46. The spiral spring 86 applies a biasing force to the cam to rotate the cam 40 in the counter clockwise direction in FIG. 3. Thus the pin 47 formed on the cam 40 engages the cam holes 55, 65 and pushes the pawls 50, 60 outwardly away from the rotational axis C. Further, by virtue of the cam surfaces 41 of the cam 40 engaging the cam surfaces 55, 65 of the pawls 50, 60, the pawls 50, 60 are pushed outwardly to cause the outer gear portions 54, 64 on the pawls 50, 60 to firmly mesh with and engage the inner gear portion 25a on the upper arm 2.

The operation of the reclining device 10 is as follows. FIG. 3 shows the locked condition of the reclining device 10. In this condition, the cam surfaces of the cam 40 and the pawls 50, 60 contact each other, and the pawls 50, 60 are pushed outwardly toward the inner gear portion 25a to cause the outer gear portions, 54, 64 of the pawls 50, 60 to mesh with and engage the inner gear portion 25a of the upper arm 2. Thus, the rotation of the upper arm 2 relative to the lower arm 1 is locked.

By operating the operating handle 85 in this locked condition, the hinge shaft 70 rotates together with the cam 40 in the clockwise direction in FIG. 3 against the biasing force of the spiral spring 86. The cam surfaces 55, 65 of the pawls 50, 60 move away from the cam surfaces 41 to release the aforementioned contact, and the pawls 50, 60 are pulled along the guide walls 12 by the engagement between the cam holes 56, 66 in the pawls 50, 60 and the pins 47 of the cam 40. Thus the outer gear portions 54, 64 of the pawls 50, 60 are released from the inner gear portion 25a, and the reclining angle of the reclining device 10 can be adjusted by rotating the seat back frame B, which supports the seat back cushion, relative to the seat frame A, which supports the seat cushion. To release the outer gear portions of the pawls 50, 60 from the inner gear portion 25a simultaneously, the cam is guided by the guide portions 122 formed on the lower arm 1.

In the lock release condition, when the seat back is reclined forwardly more than a predetermined angle or beyond a predetermined position, the engagement surface 28 formed on the inner surface of the recessed portion 26 moves to a position between the projection 51 of the pawl 50 and the inner gear portion 25a. In this condition, when the operating handle 85 is released or returned, the cam 40 is pushed in the direction of the inner gear portion 25a, but the projection or engaging portion 51 contacts the engagement surface 28 and the locking engagement is prevented. In this condition, the engagement of the cam hole 56 and the respective pin 47 maintains the cam 40 in the lock release position. The other two pawls 60 driven by the cam 40 are also maintained in the lock release positions from the inner gear portion 25a. In the region where the engagement surface 28 is formed, the seat back position is not locked and can rotate freely. Usually, a spring is installed to apply a biasing force to the seat back to recline in the forward direction. Thus, in the lock canceling angle region, the seat back can be rotated through a large angle relatively quickly, thus making passenger access to the rear seat relatively easy.

Figure 4:
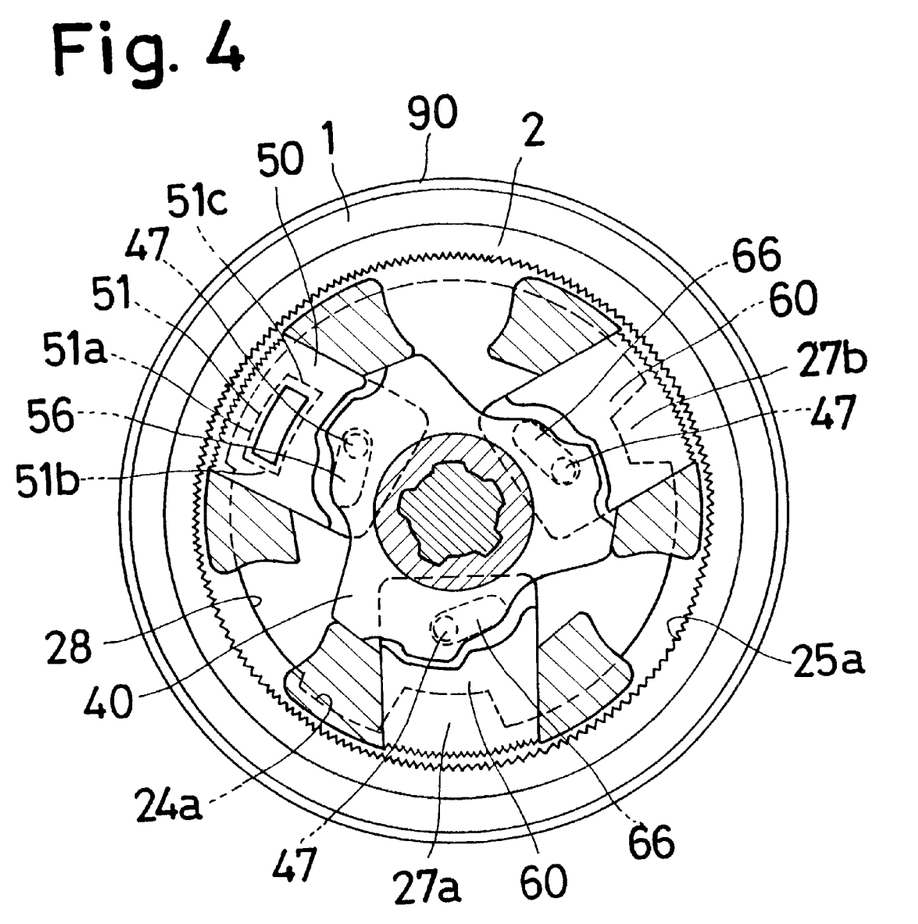
FIG. 4 is a front view of the seat reclining device shown in FIG. 1 in an assembled state illustrating the lock released condition.

When the seat back is reclined in the forward direction, that is when the upper arm 2 rotates relative to the lower arm 1 in the clockwise direction in FIG. 4, a side edge 51b of the projection 51 of the pawl 50 contacts the first stopper 27a, and further rotation of the upper arm 2 relative to the lower arm 1 is restricted. When the seat back reaches this front most position, the projection 51 of the pawl 50 engages the indented portion 24a, and the front most position of the seat back is locked.

To return the seat back to the sitting position, the operation handle 85 is operated and the outer gear portions of the pawls 50, 60 are released from the inner gear portion 25a. Then the seat back is returned and locked at the adjusted position by the passenger.

On the inner circumferential surface 24 of the recessed portion 26 of the upper arm 2, the second stopper 27b is disposed to define the maximum reclining angle in the rearward direction. During the rearward reclining operation, the projection 51 contacts the second stopper 27b to prevent further rearward reclining movement in the same way described above with respect to the forward reclining operation. The rearmost reclining angle can be set large enough to position the seat back in a horizontal position.

As can be seen from the description set forth above, the seat reclining device 10 has three pawls 50, 60 inside the inner gear portion 25a, and the adjustable angle region on the inner gear portion 25a is defined commonly by three pawls. That is, the inner gear portion 25a is not divided into several regions corresponding in number to the number of pawls. Therefore, the total reclining angle is not limited by the number of pawls, and can be set relatively large.

Figure 7:
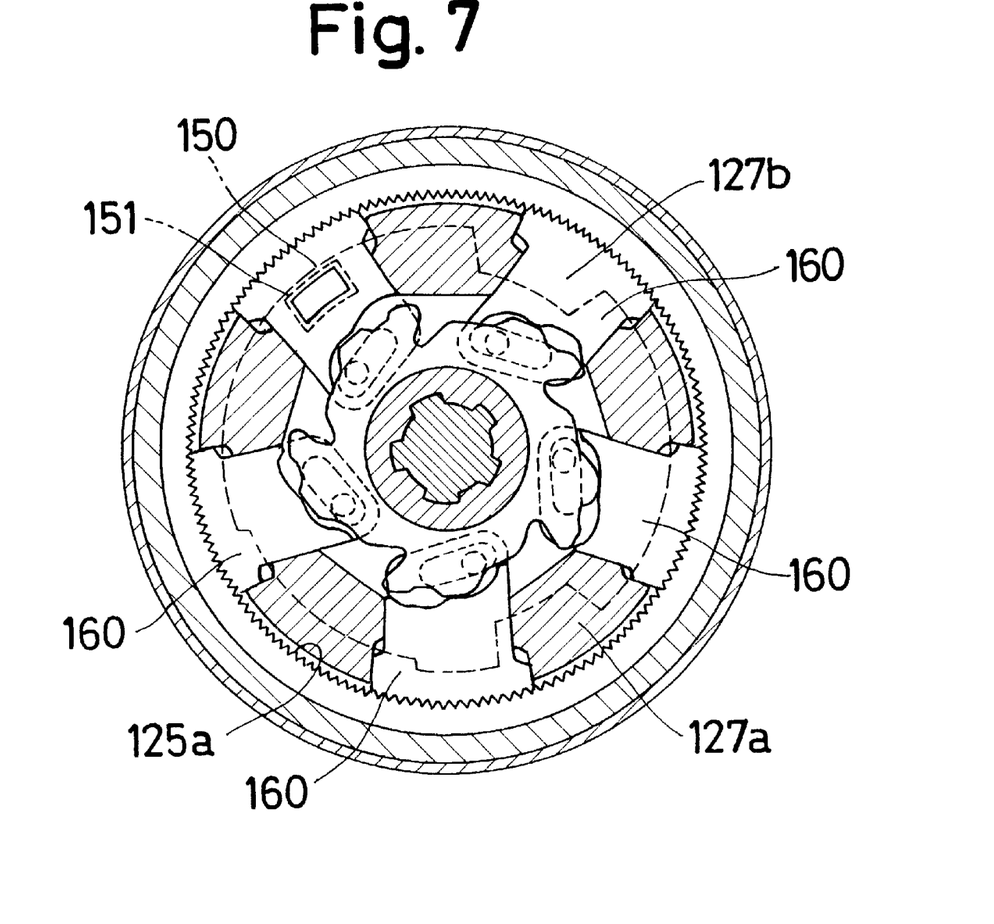
FIG. 7 is a front view of a second embodiment of the seat reclining device.

It is to be understood that the number of pawls can be increased to more than three when more strength is needed for the seat reclining device. A second embodiment of the seat reclining device 100 is shown in FIG. 7. This embodiment of the seat reclining device 100 has five pawls for enhancing the engagement strength of the seat reclining device. Only one of the five pawls has a projection 151, and the other four pawls 160 do not have a projection. As in the first embodiment described above, a first or front stopper 125a and a second or rear stopper 125b are arranged to define the forwardmost and rearwardmost reclining angle. This five pawl version can provide higher strength than the three pawl version.

Figure 8:
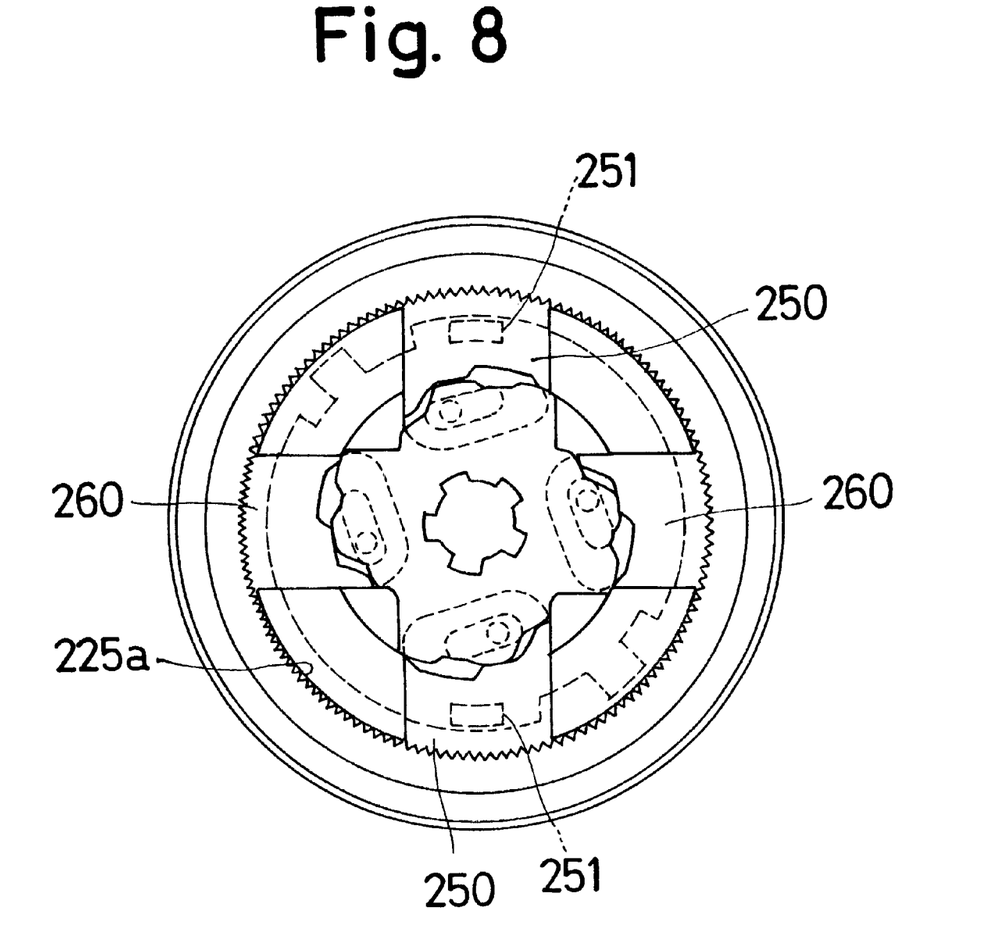
FIG. 8 is a front view of a third embodiment of the seat reclining device.

It is also to be understood that a projection can be formed on more than one, but less than all of the pawls. As shown in the FIG. 8 embodiment, a projection 251 can be formed on two of the pawls. In this case, the circular or annular inner gear portion 225a is divided into two regions, each defining a large reclining angle. This configuration still provides advantages consistent with those associated with the other embodiments because this embodiment utilizes two different kinds of pawls 260, 260 in the same manner as the two embodiments described above. It is thus apparent that other numbers of pawls can be used depending on the vehicle specifications.

In the embodiments described above, the stoppers are included inside the seat reclining device. Thus, the number of parts constituting the seat reclining device can be advantageously reduced.

The strength of the seat reclining device can be enhanced by increasing the number of pawls distributed around the axis C. This configuration reduces or makes relatively small the radial size of the seat reclining device. This vehicle seat reclining device can be especially effective in a seat which is installed with a seat belt device. Excessive force upon an emergency situation is different on the right and left sides of the seat because the seat belt is anchored on the one side of the seat back. Therefore, a vehicle seat reclining device having a greater number of pawls can be applied to seat belt anchor side of the reclining device.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device comprising:
    a first arm member adapted to be secured to one of a seat cushion frame and a seat back frame;
    a second arm member rotatably supported by the first arm member and adapted to be secured to the other of the seat cushion frame and the seat back frame;
    at least a first pawl and a second pawl movably disposed on the first arm member;
    each of the first and second pawls being provided with an outer gear portion;
    an inner gear portion formed on the second arm member for being engaged by the outer gear portion of the first and second pawls to fix a relative rotational position of the first and second arm members;
    a receiving portion provided on the second arm member;
    at least one stopper provided on the second arm member; and
    a projection provided on only one of the first and second pawls to engage the receiving portion during relative rotational movement of the first and second arm members to prevent the outer gear portions from engaging the inner gear portion, and to engage the stopper during relative rotational movement of the first and second arm member to define a forwardmost or rearwardmost reclining angle of the first and second arm members.

2. The seat reclining device according to claim 1, wherein the outer gear portion of each of the first and second pawls is moved into engagement with the inner gear portion by a rotatable cam.

3. The seat reclining device according to claim 2, wherein the first arm member has a guide portion to guide the cam when the cam is rotated to move the first and second pawls and release the engagement between the inner gear portion and the outer gear portion of each of the first and second pawls.

4. The seat reclining device according to claim 3, wherein the guide portion also includes two pairs of parallel guide walls, each pair of guide walls guiding one of the first and second pawls.

5. The seat reclining device according to claim 1, including a third pawl disposed on the first arm member and provided with an outer gear portion for engaging the inner gear portion, the third pawl being devoid of a projection which engages the receiving portion during relative rotational movement of the first and second arm members.

6. The seat reclining device according to claim 4, including a fourth pawl disposed on the first arm member and provided with an outer gear portion for engaging the inner gear portion, the fourth pawl being provided with a projection which engages another receiving portion on the second arm member during relative rotational movement of the first and second arm members.

7. The seat reclining device according to claim 1, including a rotatable cam which engages a portion of each of the first and second pawls to move the outer gear portion of each of the first and second pawls into engagement with the inner gear portion, each of the first and second pawls including a cam slot, the cam including a pair of pins, each pin being positioned in the cam slot of one of the first and second pawls.

8. A seat reclining device comprising:
    a first arm member adapted to be secured to one of a seat cushion frame and a seat back frame;
    a second arm member rotatably supported by the first arm member and adapted to be secured to the other of the seat cushion frame and the seat back frame;
    at least a first pawl and a second pawl disposed on the first arm member, each of the first and second pawls having an outer gear portion;
    an inner gear portion formed on the second arm member and engageable with the outer gear portion of the first and second pawls;
    the second arm member being provided with a receiving portion;
    only one of the first pawl and the second pawl being provided with an engaging portion that engages the receiving portion during relative rotational movement between the first and second arm members to prevent engagement of the outer gear portion of the first and second pawls with the inner gear portion.

9. The seat reclining device according to claim 8, wherein the outer gear portion of each of the first and second pawls is moved into engagement with the inner gear portion by a rotatable cam.

10. The seat reclining device according to claim 9, wherein the first arm member has a guide portion to guide the cam when the cam is rotated to move the first and second pawls and release the engagement between the inner gear portion and the outer gear portion of each of the first and second pawls.

11. The seat reclining device according to claim 10, wherein the guide portion also includes two pairs of parallel guide walls, each pair of guide walls guiding one of the first and second pawls.

12. The seat reclining device according to claim 8, including a third pawl disposed on the first arm member and provided with an outer gear portion for engaging the inner gear portion, the third pawl being devoid of an engaging portion which engages the receiving portion during relative rotational movement of the first and second arm members.

13. The seat reclining device according to claim 12, including a fourth pawl disposed on the first arm member and provided with an outer gear portion for engaging the inner gear portion, the fourth pawl being provided with an engaging portion which engages another receiving portion on the second arm member during relative rotational movement of the first and second arm members.

14. The seat reclining device according to claim 8, including a third pawl, a fourth pawl and a fifth pawl disposed on the first arm member and each provided with an outer gear portion for engaging the inner gear portion, the third pawl, the fourth pawl and the fifth pawl being devoid of an engaging portion which engages the receiving portion during relative rotational movement of the first and second arm members.

15. The seat reclining device according to claim 8, including a rotatable cam which engages a portion of each of the first and second pawls to move the outer gear portion of each of the first and second pawls into engagement with the inner gear portion, each of the first and second pawls including a cam slot, the cam including a pair of pins, each pin being positioned in the cam slot of one of the first and second pawls.

16. A seat reclining device comprising:

a first arm member adapted to be secured to one of a seat cushion frame and a seat back frame;

a second arm member rotatably supported by the first arm member and adapted to be secured to the other of the seat cushion frame and the seat back frame;

a plurality of pawls disposed on the first arm member and each provided with an outer gear portion, the plurality of pawls including a first pawl and a second pawl;

an inner gear portion formed on the second arm member and engageable with the outer gear portion on each of the first and second pawls;

the second arm member being provided with at least one stopper only one of the first pawl and the second pawl being provided with an engaging portion that engages the stopper during relative rotational movement of the first and second arm member to define a forwardmost or rearwardmost reclining angle of the first and second arm members.

17. The seat reclining device according to claim 16, wherein the outer gear portion of each of the first and second pawls is moved into engagement with the inner gear portion by a rotatable cam, the first arm member having a guide portion to guide the cam when the cam is rotated to move the first and second pawls and release the engagement between the inner gear portion and the outer gear portion of each of the first and second pawls.

18. The seat reclining device according to claim 16, wherein the plurality of pawls includes a third pawl disposed on the first arm member and provided with an outer gear portion for engaging the inner gear portion, the third pawl being devoid of an engaging portion which engages the stopper during relative rotational movement of the first and second arm members.

19. The seat reclining device according to claim 18, wherein the plurality of pawls includes a fourth pawl disposed on the first arm member and provided with an outer gear portion for engaging the inner gear portion, the fourth pawl being provided with an engaging portion which engages another stopper on the second arm member during relative rotational movement of the first and second arm members.

20. The seat reclining device according to claim 16, including a rotatable cam which engages a portion of each of the first and second pawls to move the outer gear portion of each of the first and second pawls into engagement with the inner gear portion, each of the first and second pawls including a cam slot, the cam including a pair of pins, each pin being positioned in the cam slot of one of the first and second pawls.

* * * * *